United States Patent [19]
Dolan

[11] 3,831,812
[45] Aug. 27, 1974

[54] FLUID DISPENSING SYSTEM
[75] Inventor: Albert J. Dolan, Dallas, Tex.
[73] Assignee: Daltronics International, Dallas, Tex.
[22] Filed: Sept. 1, 1972
[21] Appl. No.: 285,675

[52] U.S. Cl. .................................. 222/20, 222/36
[51] Int. Cl. ............................................. B67d 5/30
[58] Field of Search ................. 222/36, 37, 14–22, 222/71, 72, 73; 73/229–231; 235/94 R

[56] References Cited
UNITED STATES PATENTS

| | | | |
|---|---|---|---|
| 1,210,567 | 1/1917 | Geem | 222/14 |
| 2,731,171 | 1/1956 | Mankin et al. | 222/144.5 X |
| 3,307,396 | 3/1967 | Griffo | 73/231 M |
| 3,601,286 | 8/1971 | Kautz | 222/37 X |

OTHER PUBLICATIONS
Benedict, Ralph R., "Electronics for Scientists and Engineers" 1967, Prentice-Hall pages 439–440, 470–471.

Primary Examiner—Robert B. Reeves
Assistant Examiner—Joseph J. Rolla
Attorney, Agent, or Firm—Richards, Harris & Medlock

[57] ABSTRACT

Fluids dispensed in a commercial establishment are metered and/or controlled in accordance with the output of a turbine or vane flow meter in a line interconnecting a fluid bulk container and a dispensing valve. A signal output from the flow meter varies as a sine wave having a periodicity related to flow volume. This sine wave signal is amplified and squared prior to application to a logic circuit responding to the leading edge of each square wave cycle. The logic circuit generates a pulse signal for each cycle of the square wave and these pulses are counted in a digital counter having a numerical display related to the fluid flow through the turbine or vane meter. For control purposes, upon reaching a preselected count in the digital counter, a solenoid is deactivated to close a control valve in the interconnecting line between the bulk container and the dispensing valve.

10 Claims, 6 Drawing Figures

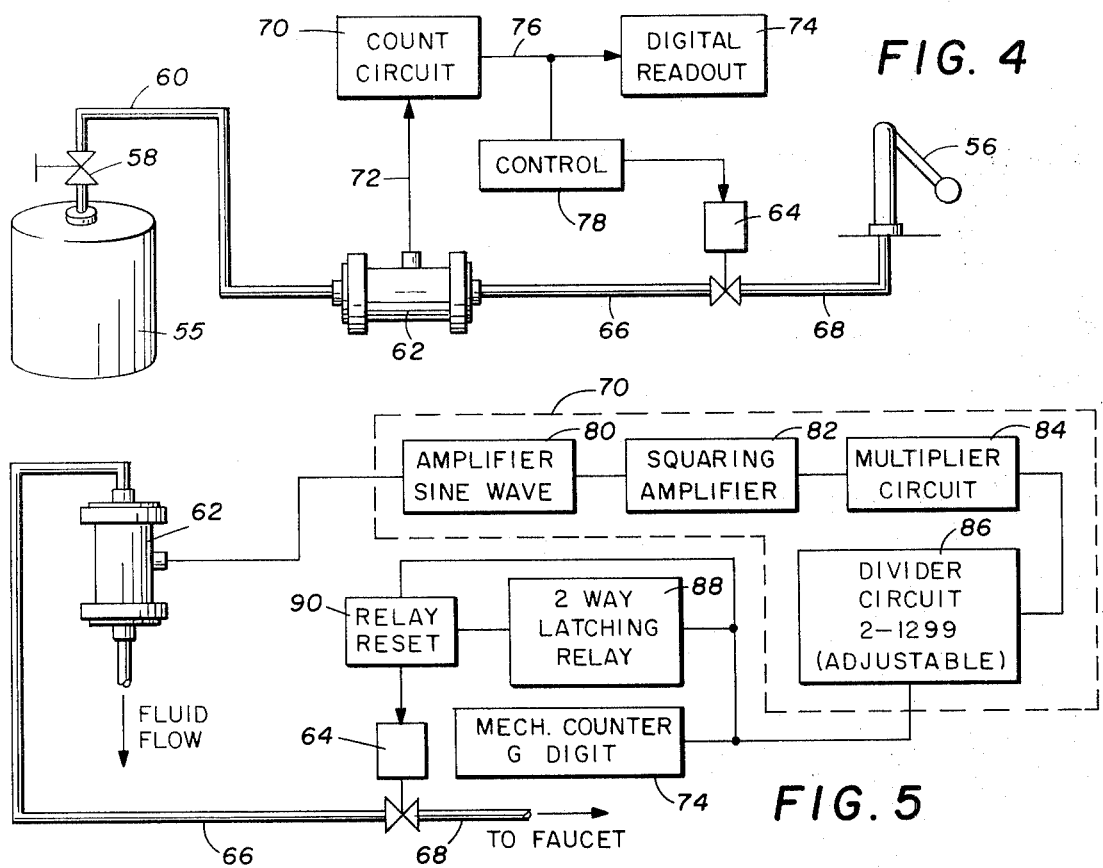
FIG. 4
FIG. 5
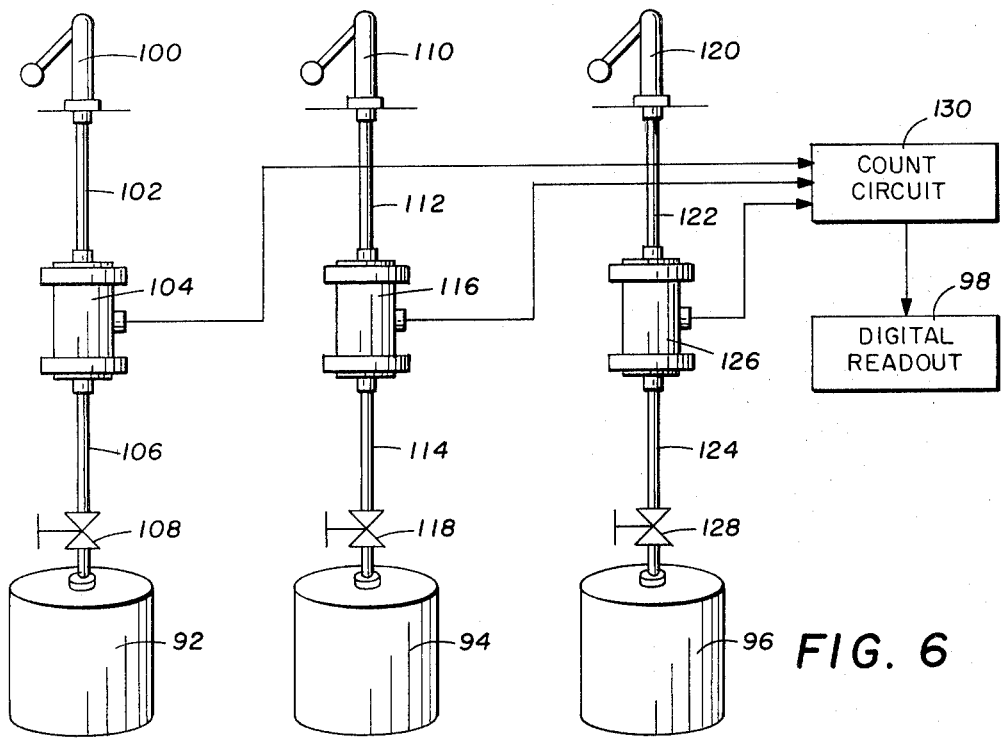
FIG. 6

3,831,812

FLUID DISPENSING SYSTEM

This invention relates to a fluid dispensing system, and more particularly to a consumer oriented fluid dispensing system for metering and/or controlling fluids.

For purposes of accounting and control, commercial establishments, such as vending stands in sports stadiums, require an accurate measure of liquids dispensed from bulk containers. For example, a vendor that dispenses a carbonated soft drink or beer from a bulk container needs to have an accurate measure of the liquid dispensed from the container to determine the gross income received. Heretofore, such a measure was often provided by a count of the number of disposable cups used during a particular time period. This method has numerous short-comings in that it does not account for refills of a disposable container to the same customer. Further, dishonest employees are adept at findings ways of having an inflated cup count at the accounting time.

Numerous attempts have been made to provide metering of a dispensed fluid at the dispensing valve. Unfortunately, when dispensing a gaseous fluid, such as a carbonated soft drink or beer, inaccurate flow measurements result due to the entrained gases. Some attempts have also been made to provide a measure of liquid dispensed from a container by weighing the container both before and after usage thereof. This is a time consuming procedure and often results in inaccuracies due to faulty weighing techniques and variances in the net weight of the container.

A feature of the present invention is to provide for metering and/or control of fluids dispensed to a consumer for accounting and inventory control. Another feature of the present invention is to provide for metering and/or control of fluids by continuously measuring fluid passing from a bulk container. Still another feature of the present invention is a system for metering and/or control of fluids providing instantaneous numerical readout related to the volume of fluid withdrawn from a bulk source.

In accordance with one embodiment of the invention, a consumer oriented fluid dispensing system includes a dispensing valve for controlling a serving of fluid to the consumer. A bulk source of fluid to be dispensed through the valve is interconnected therewith by a line that includes a flow meter responsive to the flow of fluid from the source to the valve. The meter generates a flow signal related to the volume of fluid therethrough and a circuit responsive to the flow signal of the meter produces an output having a periodic function which is applied to a counting means. The counting means totalizes the number of cycles of the periodic function to give a numerical readout related to the fluid through the flow meter.

In another embodiment of the invention, the above system includes a control valve for controlling the flow from the bulk source to the dispensing valve. In addition, this system includes a controller responsive to a preselected number of repetitions of the periodic function for closing the control valve to shut off the flow of fluid to the dispensing valve.

A more complete understanding of the invention and its advantages will be apparent from the specification and claims and from the accompanying drawings illustrative of the invention.

Referring to the drawings

FIG. 4 is an alternate embodiment of the invention for dispensing fluid from a single bulk container and including a shutoff valve responsive to a preselected digital count;

FIG. 5 is a block diagram of the control valve circuit of FIG. 4; and

FIG. 6 is an alternate embodiment of the invention for dispensing fluid from three bulk containers through individual dispensing valves wherein individual flow meters measure the flow from one of the three bulk containers and a single digital readout provides a total of fluid dispensed from the three bulk containers.

Figure 1:
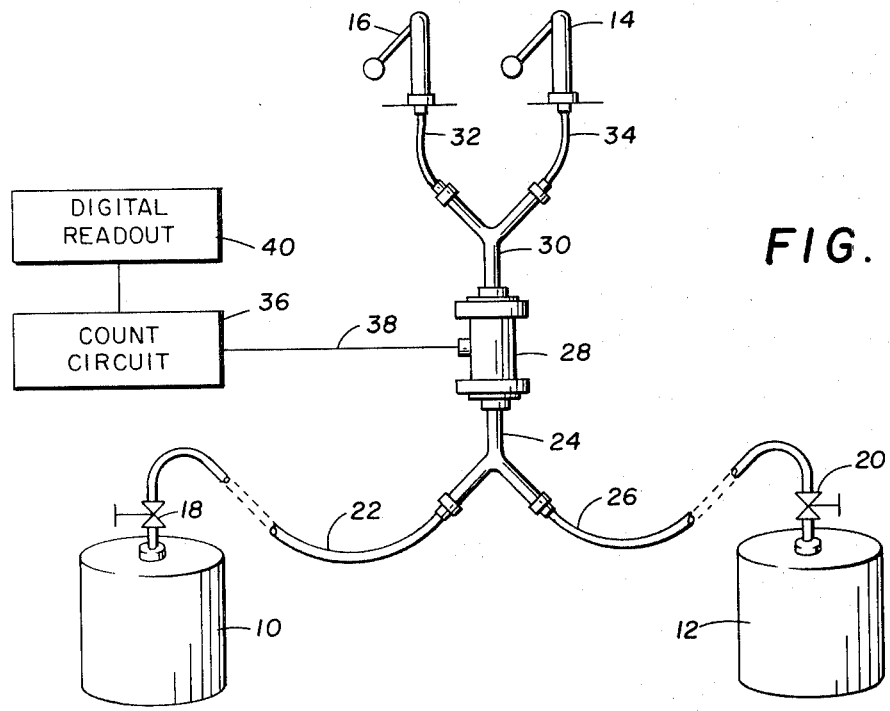
FIG. 1 is a schematic of a fluid dispensing system for dispensing from two bulk sources both metered through a single flow meter and a single digital readout.

Referring to FIG. 1, there is shown one embodiment of a liquid dispensing system in accordance with the present invention wherein bulk beverage containers 10 and 12 supply a liquid for dispensing from faucets 14 and 16. Immediate to the tap of the containers 10 and 12 are ball shutoff valves 18 and 20, respectively. A flexible line 22 interconnects the valve 18 to a Y-shaped pipe 24 having a second arm connected by means of a flexible line 26 to the valve 20. Both the lines 22 and 26 and the Y-shaped pipe 24 may be of a polyvinyl material.

The output section of the Y-shaped pipe 24 is joined to a turbine flow meter 28 for measuring the liquid flow from the containers 10 and 12 through the faucets 14 and 16. Typically, the flow meter 28 may be a model IF/5/8/2 manufactured by Electronic Flo Meters, Ltd., Hounslow, Middlesex England, or any of the other IF series as required by the measured flow. Such a flow meter incorporates a turbine that rotates as a result of a flow passing through the meter 28. Upon motion of the liquid in a positive direction, the turbine rotates about a central axis and a magnetic sensor senses each individual blade attached to the turbine. The sensor responds to a change in magnetic field and generates a signal in the form of a sine wave with the frequency of the wave related to the flow through the meter. In addition to a turbine meter, the flow meter 28 may also be of the vane type which also produces a varying frequency sine wave in response to the vane movement.

Connected to the output port of the flow meter 28 is a Y-shaped pipe 30 having a first arm connected to the faucet 16 through a flexible line 32 and a second arm connected to the faucet 14 through flexible line 34. Again, the lines 32 and 34 and the Y-shaped pipe 30 may be of a polyvinyl material.

A liquid being dispensed through the faucets 14 and 16 from the bulk containers 10 and 12 passes through the flow meter 28. This meter generates a flow signal connected to a logic count circuit 36 through a shielded cable 38. The count circuit 36 responds to the number of cycles in the signal from the flow meter 28 and produces a series of pulses that are applied to a digital counter 40 for numerically displaying the amount of liquid passing through the flow meter 28 as dispensed from the containers 10 and 12.

Figure 2:
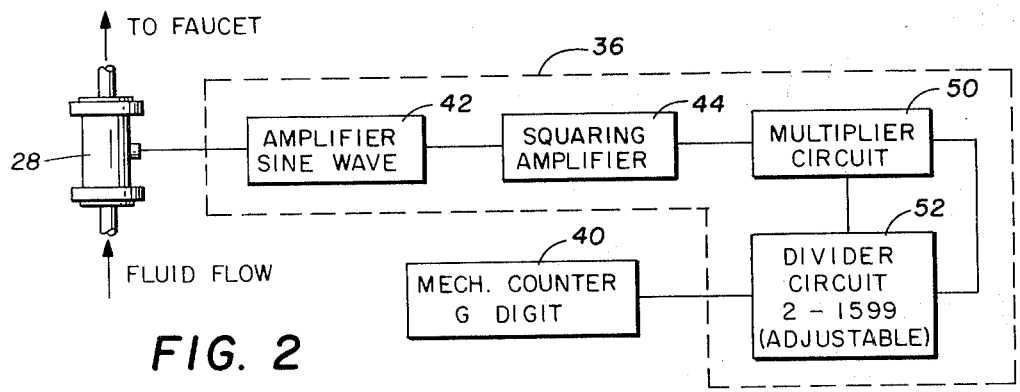
FIG. 2 is a block diagram of the measuring circuit of the system of FIG. 1 including the flow meter, count circuit and digital readout.

Referring to FIG. 2, there is shown a block diagram of the count circuit 36 and the digital counter 40. A frequency signal from the turbine 28 in the form of a sine wave is amplified by an amplifier 42 to raise the signal level to a workable value. An output from the amplifier 42 is applied to a squaring amplifier 44 wherein the sine wave varying signal is converted into a square wave signal.

Figure 3:
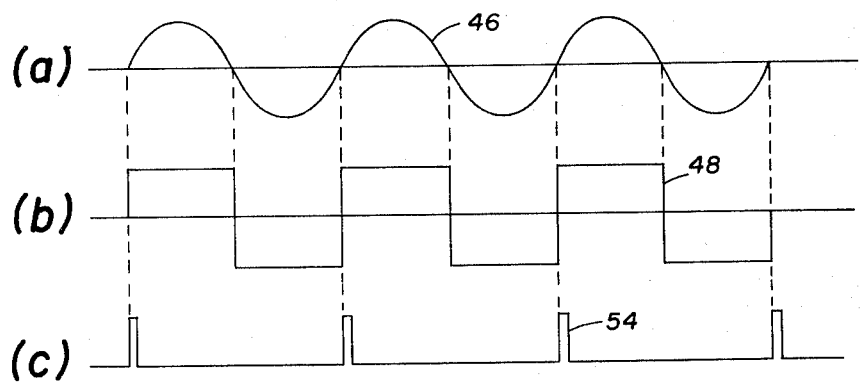
FIG. 3 is a series of waveforms for illustrating the operation of the circuit of FIG. 2.

As illustrated in FIG. 3, an output of the amplifier 42 is a sine wave as given by the waveform 46. This sine wave is converted into a square wave signal 48 appearing at the output of the amplifier 44. This square wave signal is applied to a multiplier circuit 50 wherein the number of cycles is multiplied by a programable factor, such as 1, 2, 4 or 8. For normal operation, the multiplier circuit is set at a value of 1 and the output of the circuit 50 resembles the input thereto.

This square wave signal from the multiplier circuit 50 is applied to a monostable multivibrator in a divider circuit 52. The monostable multivibrator produces one pulse for each cycle of the square wave 48. This is illustrated in FIG. 3 by the pulse train 54. Within the divider circuit 52, the number of pulses from the monostable multivibrator is divided to conform the output of the circuit 52 to the input requirements of the counter 40. The counter 40 responds to the pulse train 54 and converts this electrical signal into a mechanical display giving a numerical representation of the volume of fluid flowing through the meter 28.

In one implementation of present system, the frequency output characteristics of the turbine meter 28 is between 10,000 cyles per gallon and 13,000 cycles per gallon. The counter 40 responds only to whole number (versus fractions or decimals) and there must be compensation for a nondivisional (in terms of whole numbers) frequency output from the meter 28. Consider the following examples:

Example No. 1

Assume a turbine meter 28 generates a frequency of 12,032 cycles per gallon and the counter 40 is to indicated ounces (fluid), then it is only necessary to divide 12,032 by 128 (the number of fluid ounces in a gallon) to obtain a desired output reading. The quotient is 94.0, a whole number. In this example, the multiplier 50 is set with a programmable factor of 1 and the divider 52 set with a programmable factor of 94; thus, each time 94 pulses are sensed one count would be registered in the counter 40 to indicate one ounce of fluid has passed through the turbine 28.

Example No. 2

Assume that the frequency output of the turbine meter 28 is 11,696 cycles per gallon and the same output information is desired. A frequency output of 11,696 divided by 128 results in 91.375, which is not a whole number. Rounding this off to the nearest whole number gives an error factor of 0.58 percent; it is desired to have an error of no more than ±0.1 percent. Therefore, the frequency output of the turbine meter 28 must be increased (multiplied by whole numbers) until it becomes divisible by 128 with the quotient also being a whole number. Thus, 11,696 × 8 = 93,568 ÷ 128 = 731.0. In this, example, the programmable factor of the multiplier 50 is set at 8 and the programmable factor of the divider 52 is set at 731; thus, each time 731 pulses are sensed 1 fluid ounce is indicated by the counter 40.

Referring to FIG. 4, there is shown an embodiment of the invention wherein the flow of fluid from a bulk container 55 is metered and controlled to be shutoff after a preselected volume of fluid is dispensed through a faucet 56. Immediate the tap of the container 55 is a ball shutoff valve 58 (optional) having a connection through a flexible line 60 to a flow meter 62 which may be of the type described in FIG. 1. An output from the flow meter 62 connects to a shutoff valve 64 through flexible line 66 and an output of the shutoff valve connects to the faucet 56 through a flexible line 68.

A sine wave signal generated by the turbine or vane flow meter 62 is applied to a count circuit 70 by means of a shielded cable 72. The count circuit 70 is similar to the count circuit 36 and provides a pulse train output to a digital readout 74 by means of a line connection 76. The pulse train output of the count circuit 70 is also applied to a control circuit 78 having an output for controlling the shutoff valve 64.

Referring to FIG. 5, there is shown a block diagram of the flow meter and flow control part of the sytem of FIG. 4 wherein the output of the tubine or vane flow meter 62 is applied to the count circuit 70. As in the count circuit 36, an output from the turbine flow meter 62 is amplified in a sine wave amplifier 80 having an output as shown in FIG. 3a and applied to the input of a squaring amplifier 82. An output of the squaring amplifier 82, as shown in FIG. 3b, is applied to a multiplier circuit 84 and from the multiplier circuit to a divider circuit 86 having a pulse train output as given in FIG. 3c. This pulse train is connected to the digital counter 74 and in addition to a two-way latching relay 88 and a reset relay 90.

After the number of pulses from the divider circuit 86 passes a preselected level, the relay 90 is activated to disconnect an energizing voltage to the control valve 64, which may be a normally closed solenoid valve operating from a 110 volt AC line. To maintain the solenoid in a deenergized state to close off a flow from the container 55, the latching relay 88 is activated along with the relay 90 to hold the valve 64 in a closed position. To restart the flow from the container 54, the relay 90 is reset thereby energizing the valve 64 and opening the line from the container 55 to the faucet 56.

Referring to FIG. 6, there is shown still another embodiment of the present invention wherein a liquid beverage from bulk containers 92, 94 and 96 is metered and recorded in a digital readout 98. In this system, the beverage from each of the bulk containers is dispensed through a separate faucet. A beverage from the container 92 is dispensed through a faucet 100 connected to the container through a flexible line 102, a flow meter 104, a flexible line 106 and a ball shutoff valve 108, immediate the tap of the container 92. A beverage from the container 94 is dispensed through a faucet 110 connected to the container through flexible lines 112 and 114, a flow meter 116 and a ball shutoff valve 118 at the container tap. Similarly, a beverage from the container 96 is dispensed through a faucet 120 connected to the container through flexible lines 122 and 124, a flow meter 126 and a ball shutoff valve 128.

Each of the flow meters 104, 116 and 126 generates a sine wave signal having a frequency related to the volume of liquid dispensed through the respective faucets. These three sine wave signals are applied to a count circuit 130 wherein they are amplified, converted into a square wave signal and then applied to a divider circuit in the manner as illustrated in FIG. 2. The three square wave signals in the count circuit are converted into three pulse trains, each similar to the pulse train as illustrated in FIG. 3c. These three pulse trains are applied to combining logic that produces a composite pulse train having a number of pulses per given time interval related to the total flow through all of the flow meters 104, 116 and 126. This combined pulse train is connected to the digital readout 98 that provides a numerical display of the total amount of liquid dispensed from the containers 92, 94 and 96.

As a variation of the system of FIG. 6, the control network of FIG. 5 may be employed. A control valve would be connected in each of the flexible lines 102, 112 and 122 with the individual pulse trains prior to connecting to the combining logic connected to separate latching and reset relays as shown in FIG. 5. With this variation of the system of FIG. 6, flow from each of the containers 92, 94 or 96 is controlled to be shutoff at a preset level.

While several embodiments of the invention, together with modifications thereof, have been described in detail herein and shown in the accompanying drawings, it will be evident that various further modifications are possible without departing from the scope of the invention.

What is claimed is:

1. In a consumer oriented gaseous beverage dispensing system calibrated for a preselected beverage, the combination comprising:

dispensing valve means for controlling a serving of beverage to the consumer, a bulk source of the gaseous beverage to be dispensed through said valve means, a control valve for controlling the flow of the gaseous beverage from said bulk source to said dispensing valve, means for interconnecting said bulk source to said dispensing valve means and said control valve, a turbine flow meter as part of said means for interconnecting and responsive to the flow from said source to said dispensing valve and generating a flow signal having a frequency related to the volume of flow through said meter, circuit means including a multiplier having a programmable multiplication factor of at least one selected in accordance with the preselected beverage and a divider responsive to the output of said flow meter and preset with a programmable dividing factor determined by the programmable multiplication factor to provide a pulse train rate varying in accordance with the flow through said meter, counting means connected to said circuit means and responsive to the pulse train rate therefrom for totalizing the number of repetitions thereof to give a numerical readout related to the flow through said flow meter, and control means responsive to the reselected total number of repetitions of the periodic function for closing said control valve to shut off a flow of the beverage to said dispensing valve.

2. In a consumer oriented gaseous beverage dispensing system as set forth in claim 1 wherein said bulk source includes a plurality of bulk containers having an interconnection to said means for interconnecting.

3. In a consumer oriented gaseous beverage dispensing system as set forth in claim 2 including a squaring amplifier responsive to the flow signal and having a square wave output applied to said multiplier with a period varying as a function of the flow through said meter, and the divider responds to the output of said multiplier for producing a pulse train signal with the number of pulses in a given time interval varying as a function of the flow through said meter and connected to said counting means.

4. In a consumer oriented gaseous beverage dispensing system calibrated for a preselected beverage, the combination comprising:

dispensing valve means for controlling a serving of beverage to the consumer, a bulk source of the gaseous beverage to be dispensed through said valve means, means for interconnecting said bulk source to said dispensing valve means, a turbine flow meter as part of said means for interconnecting and responsive to the flow from said source to said valve means and generating a flow signal having a frequency related to the volume of flow through said meter, an amplifier responsive to the sinusoidal flow signal and having an output with a period, varying as a function of the flow through said meter, circuit means connected to said amplifier and including a multiplier having a programmable multiplication factor of at least one selected in accordance with the preselected beverage and a divider responsive to the output therefrom and preset with a programmable dividing factor determined by the programmable multiplication factor to provide a pulse train rate varying in accordance with the flow through said meter, and counting means connected to said circuit means and responsive to the pulse train rate therefrom for totalizing the number of cycles of the flow signal to give a readout related to the flow through said flow meter.

5. In a consumer oriented gaseous beverage dispensing system as set forth in claim 4 wherein said bulk source includes a plurality of bulk containers having an interconnection to said means for interconnecting.

6. In a consumer oriented gaseous beverage dispensing system as set forth in claim 5 wherein said counting means includes a digital counter generating a numerical readout related to the output frequency of said turbine flow meter.

7. In a consumer oriented gaseous beverage dispensing system as set forth in claim 4 including control means responsive to a preselected total number of cycles of the output frequency of said meter for closing said dispensing valve means to shut off a flow of fluid at a preset limit.

8. In a consumer oriented gaseous beverage dispensing system calibrated for a preselected beverage, the combination comprising:

a plurality of dispensing valves for controlling a serving of beverage to the consumer, a plurality of bulk containers of the gaseous beverage to be dispensed through said valve means, a plurality of interconnecting means for individually connecting one of said bulk containers to one of said dispensing valve means, a turbine flow meter as part of each of said means for interconnecting and responsive to the flow from the responsive container to said interconnected valve means and generating a flow signal having a frequency related to the volume of flow through said meter, circuit means connected to each of said flow meters and including a multiplier having a programmable multiplication factor of at least one selected in accordance with the preselected beverage and a divider responsive to the output therefrom and preset with a programmable dividing factor determined by the programmable multiplication factor to provide a pulse train rate varying in accordance with the flow through said meter, and counting means connected to said circuit means and responsive to the pulse train rate therefrom for totalizing the number of cycles of the flow signal to give a readout related to the flow through said flow meters.

9. In a consumer oriented gaseous beverage dispensing system as set forth in claim 8 wherein said circuit means includes a squaring amplifier responsive to each of the flow signals from said meter and having a square wave output with a period varying as a function of the flow through said meter.

10. In a consumer oriented gaseous beverage dispensing system as set forth in claim 9 wherein said circuit means further includes circuitry responsive to the square wave output of each of said squaring amplifiers and producing a pulse train signal with the number of pulses in a given time interval varying as a function of the flow through said meter.

* * * * *